June 12, 1962
R. J. DIEFENDORF
3,038,337
TEMPERATURE SENSITIVE DEVICE
Filed Sept. 27, 1960
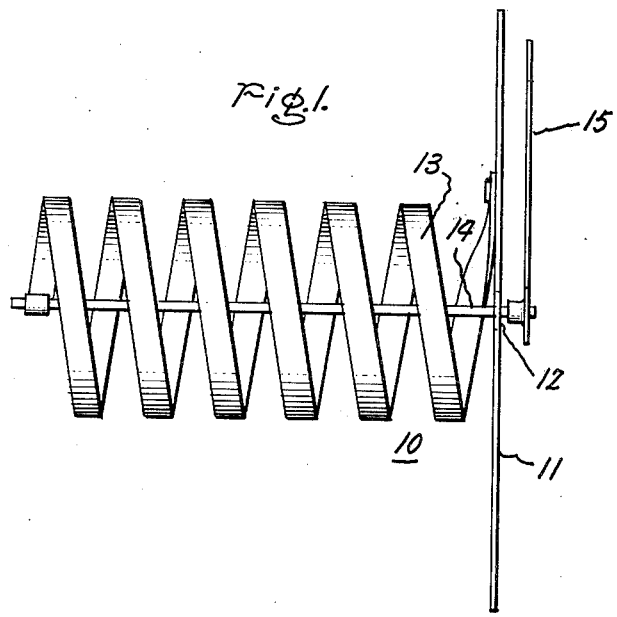
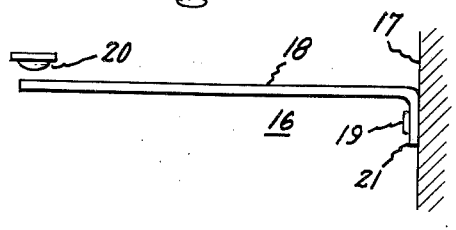
Inventor:
Russell J. Diefendorf,
by Paul R. Webb, II
His Attorney.

United States Patent Office 3,038,337
Patented June 12, 1962

3,038,337
TEMPERATURE SENSITIVE DEVICE
Russell J. Diefendorf, Schenectady, N.Y., assignor to General Electric Company, a corporation of New York
Filed Sept. 27, 1960, Ser. No. 58,732
3 Claims. (Cl. 73—363)

This invention relates to temperature sensitive devices with temperature sensitive elements in helical or strip form and more particularly to such devices with elements containing a single material.

Present temperature sensitive devices which employ bimetallic elements are used as thermometers and in thermostatic controls to measure and control temperatures up to approximately 1000° C. The temperature range of such devices might be expanded to about 2000° C. by choosing suitable high temperature materials for the bimetallic elements. However, a serious materials problem exists to provide a bimetallic element which will operate above 2000° C. Thus, it would be desirable to measure and control temperatures including temperatures above 2000° C. Furthermore, it would be advantageous if the temperature sensitive element of the device were composed of a single material rather than employing a bimetallic strip for operation over a wide temperature range.

It is an object of my invention to provide a temperature sensitive device for measuring or controlling temperatures including temperatures above 2000° C.

It is another object of my invention to provide a temperature sensitive device with a temperature sensitive element employing a single material.

It is a further object of my invention to provide a temperature sensitive device with a temperature sensitive element having a high degree of orientation and anisotropy from the group consisting of pyrolytic graphite and boron nitride.

In carrying out my invention in one form, a temperature sensitive element with a high degree of orientation and anisotropy selected from the group consisting of pyrolytic graphite and boron nitride is affixed to supporting means, and associated temperature indicating means are actuated by the element to provide a temperature sensitive device.

These and various other objects, features and advantages of the invention will be better understood from the following description taken in connection with the accompanying drawing in which:

FIGURE 1 is an elevational view of a temperature sensitive device embodying a temperature sensitive element of my invention; and FIGURE 2 is an elevational view of a modified temperature sensitive device.

In FIGURE 1 of the drawing, a temperature sensitive device shown generally at 10 comprises a support 11 with a centrally disposed aperture 12 therein, a temperature sensitive element 13 in the form of a helix affixed at one end to support 11 and affixed at the other end to a rod 14, and a pointer 15 secured to rod 14. Pointer 15 moves over a calibrated scale on the face of support 11 and is actuated by rod 14 extending through aperture 12. If desired, the calibrated scale is located on a separate member and positioned between support 11 and pointer 15.

Present temperature sensitive devices employ a temperature sensitive element consisting of two thin flat strips of different metals, welded or riveted together. One of the metals has a larger coefficient of expansion than the other metal whereby the flat element bends into a curve when it is heated. When such an element is used as a thermostat, one end of the strip is fixed to a support and the motion of the other end is made to open and close an electrical control circuit. A conventional oven thermometer consists of a bimetallic strip coiled in a helix. With changes in temperature the helix winds up or unwinds, and this motion is transmitted to a pivoted pointer which moves over a calibrated scale.

I discovered that pyrolytic graphite and boron nitride show extremely different thermal expansion coefficients in the "c" crystallographic direction and in those directions perpendicular thereto. Pyrolytic graphite is defined as a polycrystalline material made from carbonaceous gases by thermal decomposition and deposition on a surface in which the planar graphite crystallites are aligned into a layer structure. The thermal expansion coefficients of a piece of pyrolytic graphite or boron nitride are measured along the "C" axis and the "A" axis, an axis generally perpendicular to the "C" axis. The "C" axis or direction is defined as the component of the maximum measured number of crystallites in the "c" direction or orientation. The "A" axis or direction is defined as the component of the maximum measured number of crystallites in directions perpendicular to the "c" direction. While this anisotropy is generally undesirable, I found further that pyrolytic graphite and boron nitride were useful as temperature sensitive elements for temperature sensitive devices. My research disclosed additionally that both of these materials could be employed individually in helical or strip form to provide temperature sensitive elements without the inclusion of a second metal welded or riveted thereto. In present bimetallic strip devices, the sensitivity of the device depends upon the difference in thermal expansion coefficients but measured in the same direction. However, pyrolytic graphite and boron nitride elements depend on the difference in thermal expansion coefficients but measured perpendicular and parallel to the "C" direction.

The thermal expansion coefficient of pyrolytic graphite in its "C" direction is in the range of $22.0 \times 10^{-6}$ to $28.5 \times 10^{-6}$ per centigrade degree. However, in its "A" direction this material shrinks from 0° C. to about 700° C. In the range of 0° C. to 1000° C., the average thermal expansion coefficient is $1.8 \times 10^{-6}$ per centigrade degree. The extremely different thermal expansion coefficients in different directions of pyrolytic graphite and boron nitride provide a temperature sensitive element of a single material which is useful over a wide temperature range.

When operating temperatures above 2000° C. are encountered, a neutral reducing atmosphere of argon or helium is used to surround the element. Carbon monoxide or hydrogen can also be utilized for this purpose. For example, a temperature sensitive device with a pyrolytic graphite or boron nitride element may be used in a high temperature hydrogen furnace which will provide a protective atmosphere for the element. The above elements are capable of operation up to about 2200° C. for prolonged periods of time. Above this temperature, such elements will operate for short intervals.

As shown in FIGURE 1 of the drawing, a temperature sensitive element 13 of pyrolytic graphite or boron nitride is employed. Such an element can be produced by cutting a cylinder of the material to form the helix. The ends of elements 13 are welded or otherwise secured to support 11 and rod 14. A pointer 15 secured to rod 14 moves over a calibrated scale on the face of support 11. It is necessary in the operation of a temperature sensitive device that the temperature sensitive element selected from the group consisting of pyrolytic graphite and boron nitride be curved so that the orientation of the "C" axis varies along the element. This curvature is imparted to the helical element 13 by cutting the element from a cylinder of the material. The stresses set up by a change in temperature because of the difference in thermal expansion coefficients in the parallel "A" and perpendicular "C" axes will cause the curvature to increase or decrease. Thus, in the operation of device 10, element 13 will uncoil when heated and will coil when cooled. The movement of element 13 in response to temperature changes is transmitted to rod 14 which moves pointer 15 over the calibrated scale on supporter 11.

In FIGURE 2 of the drawing a modified temperature sensitive device 16 is shown which includes a support 17 to which one end of a strip temperature sensitive element 18 of pyrolytic graphite or boron nitride is affixed by rivet 19. An electrical conducted button 20, which is a part of an electrical control circuit (not shown), is positioned adjacent to the free end of element 18. It is necessary to curve strip element 18 so that the orientation of the "C" axis varies along the element. The stresses set up by a change in temperature because of the difference in thermal expansion coefficients in the parallel "A" and perpendicular "C" axes will cause the curvature to increase or decrease. This curvature is imparted to element 18 by bending thereof to provide a flange 21 through which rivet 19 is affixed. In operation, a predetermined increase in temperature causes element 18 to make contact with button 21 thereby closing the circuit. A predetermined decrease in temperature causes element 18 to break contact with button 20 thereby opening the circuit.

While other modifications of this invention and variations of structure which may be employed within the scope of the invention have not been described, the invention is intended to include such that may be embraced within the following claims.

What I claim as new and desire to secure by Letters Patent of the United States is:

1. In a temperature sensitive device including supporting means, and temperature indicating means, the combination therewith of a curved temperature sensitive element with a high degree of orientation and anisotropy selected from the group consisting of pyrolytic graphite and boron nitride, said curvature varying the orientation of the "C" axis along said element, and said element affixed to said supporting means and adapted to actuate said temperature indicating means.

2. In a temperature sensitive device including supporting means, and temperature indicating means, the combination therewith of a helical temperature sensitive element with a high degree of orientation and anisotropy selected from the group consisting of pyrolytic graphite and boron nitride, said helical curvature varying the orientation of the "C" axis along said element, and said element affixed to said supporting means and adapted to actuate said temperature indicating means.

3. In a temperature sensitive device including supporting means, and temperature indicating means, the combination therewith of a curved strip temperature sensitive element with a high degree of orientation and anisotropy selected from the group consisting of pyrolytic graphite and boron nitride, said curvature varying the orientation of the "C" axis along said element, and said element affixed to said supporting means and adapted to actuate said temperature indicating means.

References Cited in the file of this patent
UNITED STATES PATENTS
2,839,413     Taylor _____ Mar. 12, 1956